Feb. 5, 1952            B. DA COSTA            2,584,674
MEANS FOR RECAPTURING USEFUL FUEL FROM THE EXHAUST
GASES OF INTERNAL-COMBUSTION ENGINES
Filed March 14, 1951            2 SHEETS—SHEET 1

INVENTOR.
B. DA COSTA
BY J. Ledermann
ATTORNEY

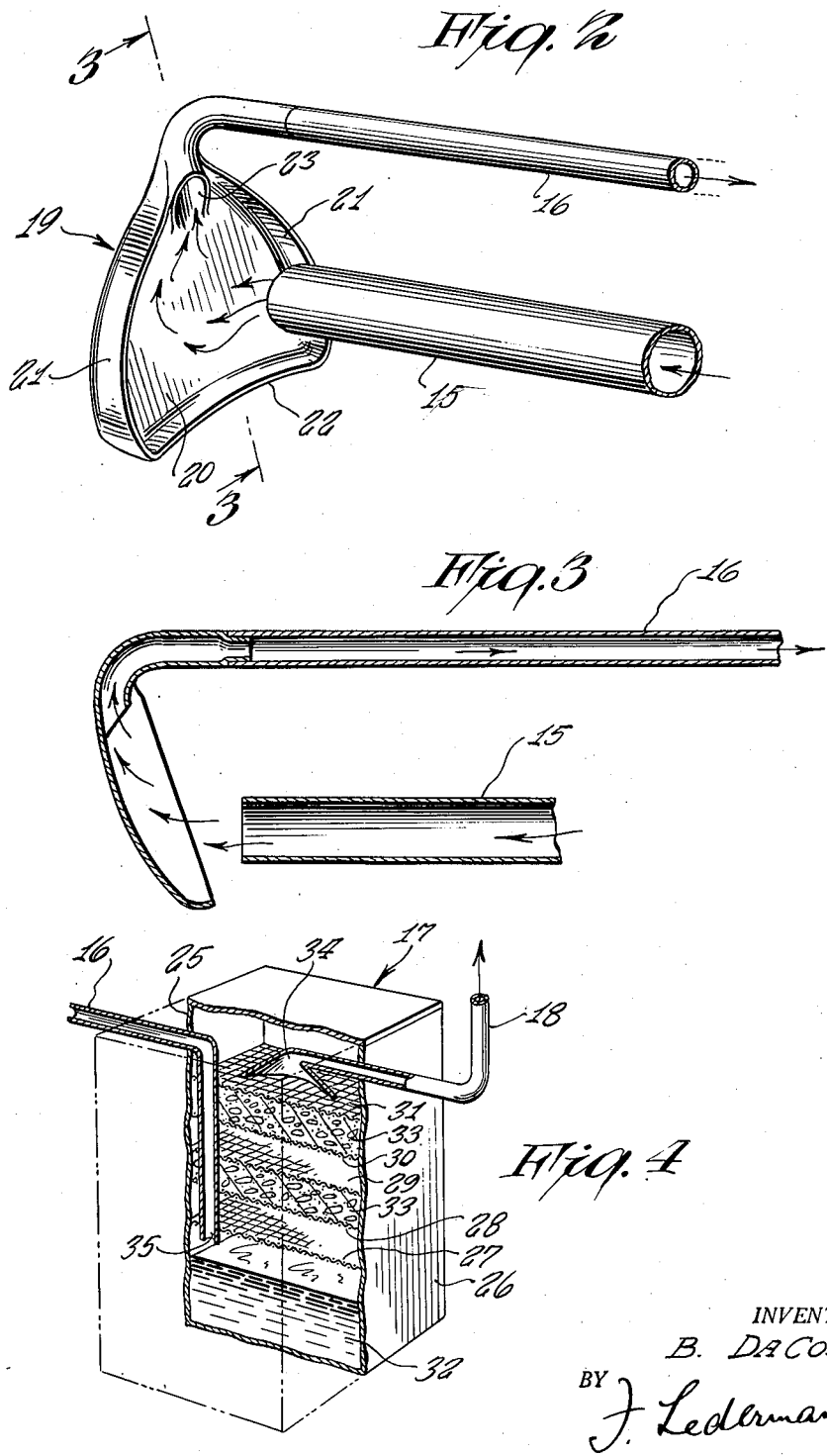

Patented Feb. 5, 1952

2,584,674

UNITED STATES PATENT OFFICE 2,584,674

MEANS FOR RECAPTURING USEFUL FUEL FROM THE EXHAUST GASES OF INTERNAL-COMBUSTION ENGINES

Bartholomew Da Costa, Sunnyside, N. Y.

Application March 14, 1951, Serial No. 215,508

3 Claims. (Cl. 123—119)

1

This invention relates to means for recapturing a substantial portion of the fuel energy remaining in the exhaust gases of internal combustion engines, particularly those used on automotive vehicles, and utilizing the refined gases for reentry into the intake manifold of the engine for further combustion thereof, thereby substantially increasing the fuel efficiency of the gasoline or other liquid fuel used.

Another object of the invention is the provision of novel and practical means to aid in the return of a substantial portion of the exhaust gases of the engine into a treatment tank and thence into the intake manifold.

The above as well as additional and more specific objects will be clarified in the following description, wherein characters of reference refer to like-numbered parts in the accompanying drawings. It is to be noted that the drawings are intended solely for the purpose of illustration, and that it is neither intended nor desired to limit the invention necessarily to any or all specific details shown except insofar as they may be deemed essential to the invention.

Referring briefly to the drawings,

Fig. 2 is an enlarged fragmentary perspective view of the exhaust tail pipe and the return pipe for a substantial portion of the exhaust gases into the treatment tank.

Fig. 3 is a sectional view taken on the line 3—3 of Fig. 2.

Fig. 4 is an enlarged perspective view, with parts broken away and partly in section, of the treatment tank or filter, showing also the inlet pipe and the outlet pipe thereof.

Figure 1:
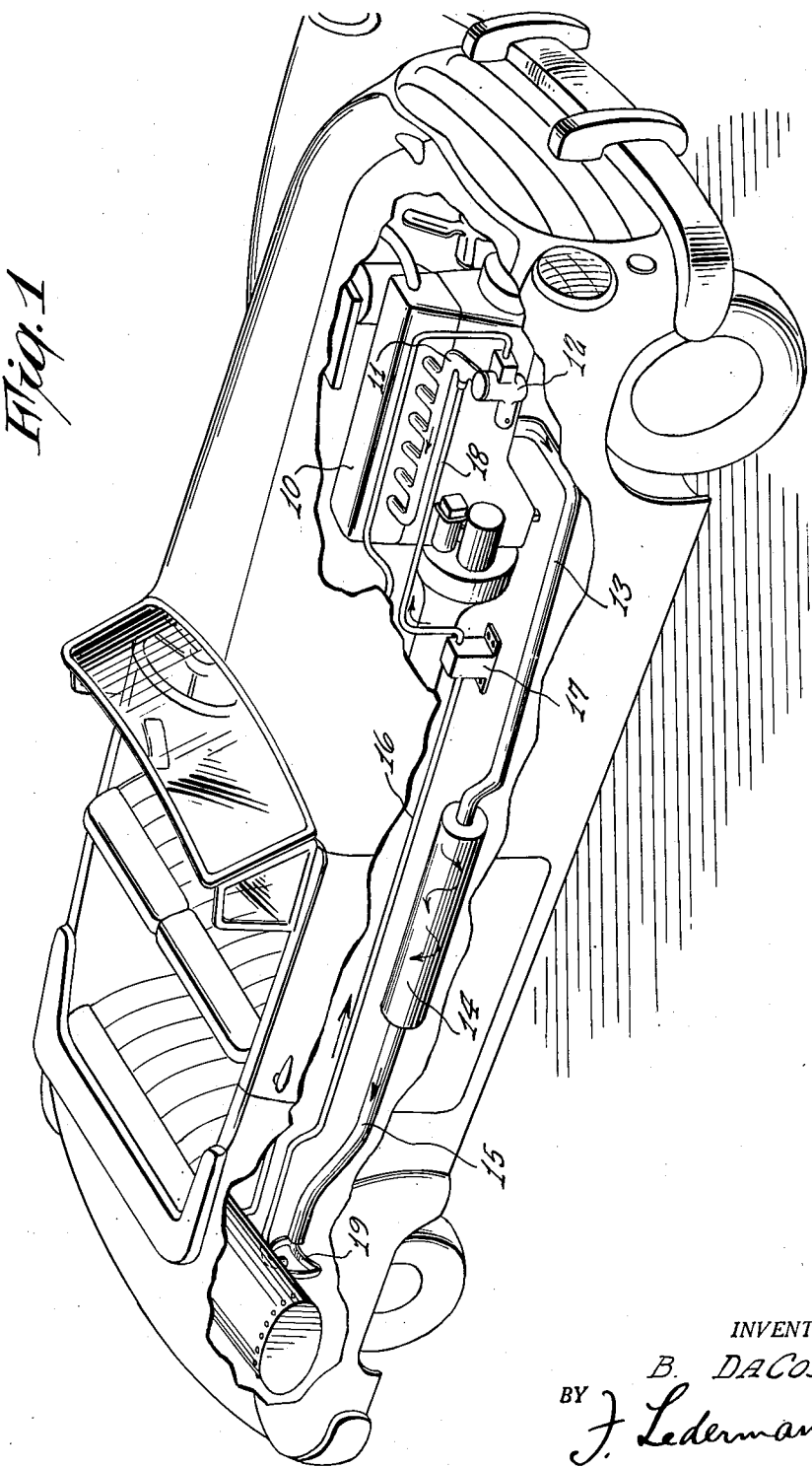
Fig. 1 is a perspective view, with parts broken away to expose the interior, of an automotive vehicle equipped with the apparatus of this invention.

Referring in detail to the drawings, the numeral 10 indicates the internal combustion engine of an automotive vehicle, the intake manifold of which is shown at 11 leading from the carburetor 12. The engine exhaust pipe is shown at 13, leading into the muffler 14 from which the tail pipe 15 extends rearward.

A return pipe 16 extends approximately parallel with the exhaust path 13, 14, 15 and leads into the treatment tank or filter 17. A filter outlet pipe 18 leads from the filter 17 into the intake manifold 11 of the engine between the carburetor and the engine.

The tail pipe 15 is positioned under the return pipe 16, with the latter extending substantially as shown, farther rearward. The pipe 16 terminates in a downwardly extending baffle 19 positioned close to but spaced from the open extremity of the tail pipe. The baffle 19 comprises a concave rear wall 20, approximately triangular in configuration, having at the sides of the triangle the walls 21 and at the base of the triangle the wall 22, all of which walls extend at approximately right angles to the concave wall 20, but it is to be noted that the portions of the baffle where the walls 21 and 22 meet the wall 20 are all well rounded. A neck 24 on the end of the pipe 16 provides for positioning the baffle as shown, at a small acute angle to the vertical, and the lower end of the neck is of course open as shown at 23. It is thus apparent that exhaust gases being discharged from the tail pipe 15 will impinge on the slanted concave wall 20 of the baffle and will be guided by all the walls 21 and 20 in the direction of the opening 23 into the pipe 16.

The filter 17 comprises a housing having opposed side walls 25 and 26. Spaced horizontal screens 27—31, inclusive, are mounted throughout the height of the housing, between and spaced from both the floor and roof. In the bottom of the housing, below the screen 27, a quantity of suitable liquid 32 is provided, such as, for example, a mixture of water and alcohol. Between the screens 28 and 29, as well as between the screens 30 and 31, a filler of suitable porous material, such as, for example, wood shavings, is mounted.

Between the roof of the housing and the topmost screen 31, the pipe 18 enters the housing and on its inner end is provided with a horizontal widened or funnel-shaped hood 34.

It is apparent that through the medium of the pipe 18, a suction will constantly be applied in the pipe 18 by virtue of its connection with the intake manifold 11. This suction will tend to draw from the housing whatever gases rise therein, and of course for best operation the hood 34 is located at the top just under the roof of the housing. Hence, a suction is also provided on the end 35 of the pipe 16 which is positioned within the housing, preferably just above the level of liquid 32. The latter suction together with the pressure of exhaust gases upon leaving the tail pipe 15, will tend to draw exhaust gases through the open end 23 of the neck 24.

It is evident that a goodly portion of heavier solid particles contained in the exhaust gases entering the filter through the return pipe 16, will fall into the liquid 32 and thus will be trapped. Of such solid particles which fail to be trapped in the liquid, a large proportion will be screened out of the gases in the housing by passing successively through the porous fillers 33, so that the gases passing into the intake manifold 11 through the pipe 18 will have been nearly completely freed of solid particles and dust. Moreover, the liquid 32 will absorb some of the gas impurities of the returning exhaust gases.

As a consequence of the provision of the structure above set forth, a goodly portion of the useful fuel energy contained in the usual exhaust gases of an internal combustion engine, is recaptured and utilized, thus substantially enhancing the fuel efficiency and economy of the engine.

Obviously, modifications in form or structure may be made without departing from the spirit or scope of the invention.

I claim:

1. In combination with an internal combustion engine having an intake manifold and an exhaust pipe, a filter, a pipe connecting the top of said filter with said manifold, the exhaust end of said exhaust pipe lying substantially horizontal, a return pipe positioned above said exhaust pipe and extending in one direction beyond the extremity of the exhaust end of the exhaust pipe, said return pipe extending in the other direction into said filter and terminating near the bottom of the filter, said return pipe having a downwardly extending baffle positioned adjacent but spaced from said extremity of the exhaust pipe, said baffle having guide walls for directing exhaust gases from said exhaust pipe into said return pipe.

2. The combination set forth in claim 1, said baffle comprising a concave wall substantially triangular in outline with two sides of the triangle intersecting at the free extremity of said return pipe and extending divergently downward therefrom and the base of the triangle positioned below the extremity of the said exhaust pipe, said concave wall sloping at an acute angle to the vertical in the direction of said exhaust pipe, said sides and base of the triangle having walls extending approximately at right angles to said concave wall and in the general direction of said exhaust pipe.

3. The combination set forth in claim 1, said filter comprising an upright housing having a quantity of liquid in the bottom thereof, a plurality of vertically spaced horizontal screens in said housing above the level of said liquid, some of the mutually adjacent pairs of said screens having fillers of porous material therebetween.

BARTHOLOMEW DA COSTA.

No references cited.